United States Patent [19]

Torikai et al.

[11] 4,111,866
[45] Sep. 5, 1978

[54] METHOD OF MAKING A CHEMICAL-RESISTANT DIAPHRAGM THEREOF

[75] Inventors: Eiichi Torikai, Yao; Youji Kawami, Kawachi-nagano; Shinichiro Kai, Ibaragi; Mutsusuke Namba; Shuhei Simasaki, both of Settsu, all of Japan

[73] Assignees: Agency of Industrial Science and Technology, Tokyo; Daikin Kogyo Co., Ltd., Osaka, both of Japan

[21] Appl. No.: 789,440

[22] Filed: Apr. 20, 1977

[30] Foreign Application Priority Data

Apr. 20, 1976 [JP] Japan .................................. 51-45931

[51] Int. Cl.² .............................................. C08J 9/26
[52] U.S. Cl. ...................................... 521/53; 204/296; 210/500 M; 521/55; 521/145
[58] Field of Search ............... 210/500 M; 260/2.5 M; 204/296

[56] References Cited

U.S. PATENT DOCUMENTS

| 3,929,950 | 12/1975 | Nakamura et al. | 260/2.5 M |
| 4,049,589 | 9/1977 | Sakone | 260/2.5 M |

*Primary Examiner*—Morton Foelak
*Attorney, Agent, or Firm*—Oblon, Fisher, Spivak, McClelland & Maier

[57] ABSTRACT

A chemical-resistant diaphragm composed of a fluorine-containing polymer and potassium titanate and a method for the manufacture of said diaphragm by the steps of adding titanium oxide or titanic acid to a fluorine-containing polymer and heating the resultant mixture in the presence of potassium hydroxide.

8 Claims, 4 Drawing Figures

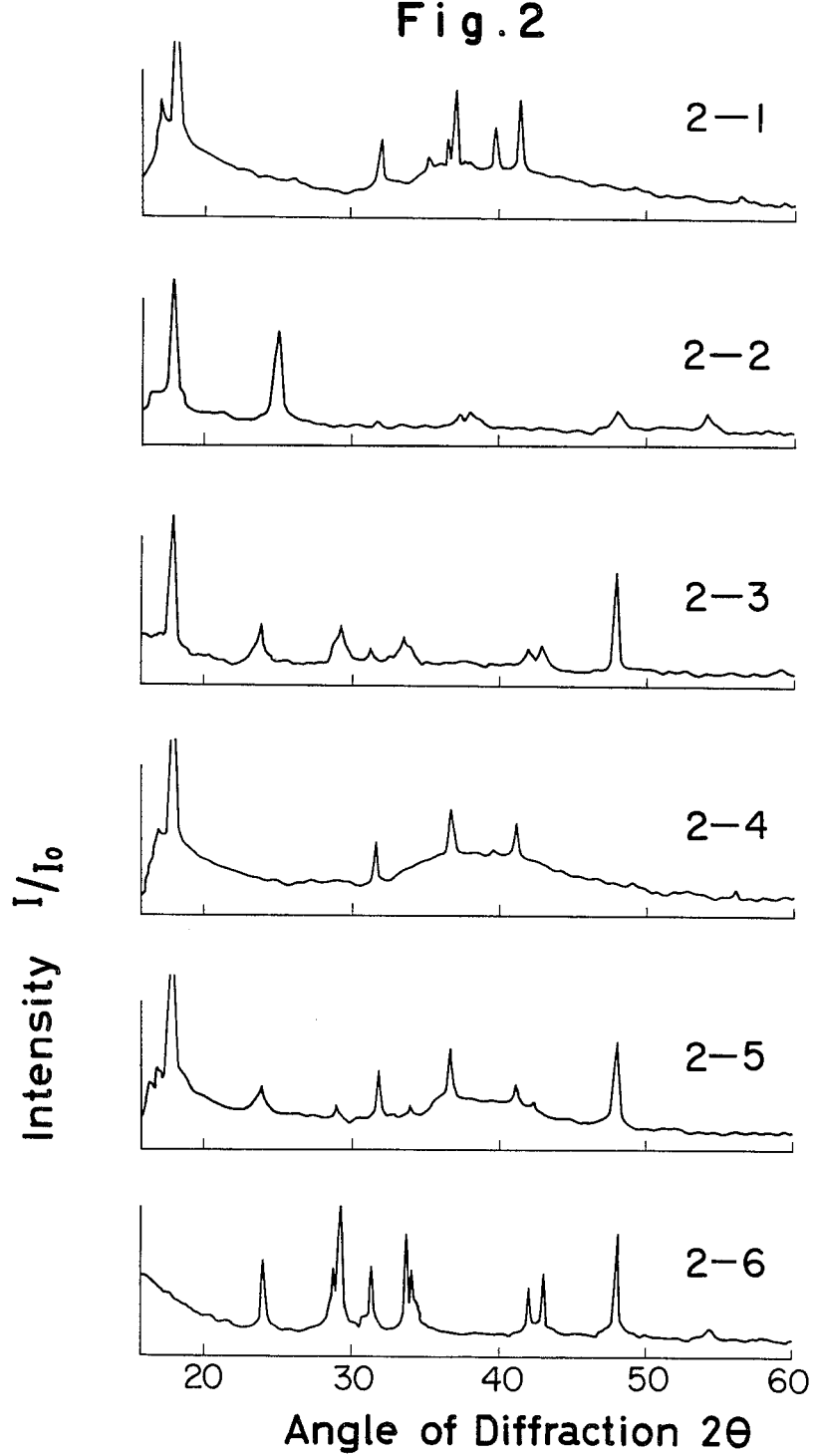

METHOD OF MAKING A CHEMICAL-RESISTANT DIAPHRAGM THEREOF

BACKGROUND OF THE INVENTION

This invention relates to a diaphragm excelling in chemical properties, particularly in alkali resisting property and to a method for the manufacture of said diaphragm. More particularly, the present invention relates to a novel diaphragm which substantially comprises a fluorine-containing polymer and potassium titanate, excels in hydrophilicity, possesses low electric resistance and exhibits good water permeability and offers high resistance to chemicals, particularly to alkalis and also to a method for the manufacture of said diaphragm.

Generally diaphragms of fluorine-containing polymers are used in diaphragm-type electrolytic cells for the decomposition such as of sodium chloride or water, fuel cells and alkali cells each for the purpose of keeping two kinds of gases or liquids from mingling with each other.

For use in the fields involving electrolytic processes and electric cell production, the diaphragms are required to possess certain properties. Examples of desirable properties are (1) excellent permeability to ions, (2) low electric resistance, (3) distribution of voids of a uniform, fine diameter, (4) excellent uniformity of current distribution, (5) electrical non-conductivity of the diaphragm itself (6) resistance to corrosion, (7) stability enough to withstand variations in conditions such as temperature and pH and (8) sufficient mechanical strength. Heretofore, fluorine-containing polymers have been known to be capable of withstanding the chemical actions such as of chlorine and alkalis and many methods have been proposed for the production of diaphragms from fluorine-containing polymers. Various products made of these polymers are now available on the market. Because of lack of hydrophilicity and a gradual rise in electric resistance experienced during their continued use, however, these products cannot be used in their unaltered form. If the pores in the diaphragm are given increased diameter for the purpose of lowering the diaphragm's electric resistance, then the volume of water permitted to pass through the diaphragm increases and the capacity of the diaphragm for separation of anolyte and catholyte is lowered possibly to the extent of completely depriving the diaphragm of its intended utility. It is, therefore, an important task for the industry to develop a diaphragm which excels in resistance to chemicals and possesses low electric resistance and proper water permeability both adequate for the uses to which the diaphragm is put.

For the accomplishment of this task, there have been suggested various methods for conferring hydrophilicity upon the diaphragms made of fluorine-containing polymers. A method which comprises immersing a diaphragm in an organic solvent such as, for example, methanol, acetone or methylethyl ketone which sufficiently wets fluorine-containing polymers and yet is soluble in water and immediately transferring the diaphragm in its swelled state into water (Japanese patent publication No. 38603/71, Japanese patent disclosure No. 52681/73) and a method which comprises coating the surface of a diaphragm of fluorine-containing polymer with a surface active agent are typical of the various methods (Japanese patent publication No. 38603/71, Japanese patent disclosure No. 1377/76).

Since these agents which serve to confer hydrophilicity upon diaphragms are soluble in media with which the diaphragms are destined to remain in intimate contact, the diaphragms when used in electrolytic solutions containing dissolved gases or when used in electrochemical reactions involving evolution of gases, are liable to resume their inherent hydrophobic nature owing to the high affinity fluorine-containing polymers exhibit for gases. Besides, methods which produce diaphragms by mixing powdered fluorine-containing polymers with hydrophilic powders such as of silicon dioxide, titanium oxide, zirconium oxide and calcium fluoride or with hydrophilic cellulosic substances such as glass fiber, zirconia fiber and asbestos fiber and forming the resultant mixtures in required shapes (Japanese patent publication No. 25267/71, Japanese patent publication No. 978/73 and Japanese patent disclosure No. 26770/75) and a method which comprises mixing a powdered fluorine-containing polymer with a pore-forming agent capable of being dissolved out and forming the resultant mixture in a required shape (Japanese patent disclosure No. 81279/74) have also been known to the art. The diaphragms obtained by these methods excel those obtained by the aforementioned methods resorting to use of agents for conferring hydrophilicity in terms of the durability of acquired hydrophilicity. Nevertheless, they hardly can be regarded as possessing sufficient hydrophilicity. Although it may be suggested that improvement of the hydrophilicity may be attained by decreasing the particle diameter of the hydrophilic powder or even by increasing the amount thereof, a diaphragm obtained in consequence of such a measure would show extremely lowered strength. In the case of a diaphragm having polytetrafluoroethylene as its fluorine-containing polymer, the presence of such a hydrophilic powder causes the diaphragm to develop cracks when it is subjected to burning in the course of manufacture, making it extremely difficult to produce a product of satisfactory shape. There has also been known a method which comprises immersing a porous fluorine-containing polymer in a suspension having dispersed therein a finely divided hydrophilic powder such as of silicon dioxide or titanium oxide for thereby causing silicon dioxide or titanium oxide to be deposited inside the voids of the polymer (Japanese patent publication No. 38603/71). In the diaphragm obtained by this method, the hydrophilicity proves to be satisfactory. It is nevertheless extremely difficult to have solid particles uniformly deposited on the interior of diaphragm, particularly onto the inner surfaces of voids of very small diameters. This diaphragm has an additional disadvantage in that the finely divided particles deposited inside the diaphragm are readily released while the diaphragm is in use. These various disadvantageous phenomena point to a possibility that the hydrophilicity desired to be conferred upon a diaphragm throughout the entire thickness thereof without reference to the fineness of the diameter of voids present therein may be realized advantageously by a method which comprises allowing such solid particles to permeate in the form of a solution into the diaphragm and subsequently converting the deposited powdered substance into an insoluble compound for thereby causing the deposited particles to be educed uniformly within the diaphragm. Methods which rely upon this process for eduction of the hydrate of titanium oxide within a diaphragm have been suggested to the art (Japanese patent disclosure No. 81281/74 and Japanese patent disclosure No. 1373/76).

Undeniably, diaphragms obtained by these methods have excellent qualities in respect of hydrophilicity. In terms of resistance to chemicals, particularly to alkalis, however, they are not perfect. If such a diaphragm is used in an aqueous solution containing 30% (by weight; the same is applicable hereinafter) of sodium hydroxide or potassium hydroxide at an elevated temperature, for example, it undergoes a change of weight of such magnitude as to become no longer usable.

The inventors made studies in search of a stable diaphragm which possesses both hydrophilicity and resistance to chemicals, particularly to alkalis. They have consequently made a discovery that there can be manufactured a diaphragm capable of being advantageously used under conditions of a high temperature not lower than 90° C. and an alkali concentration not less than 30%. The present invention has been accomplished on the basis of this discovery.

An object of the present invention is to provide a diaphragm which excels in hydrophilicity and resistance to chemicals.

Another object of this invention is to provide a method for the manufacture of a diaphragm excelling in hydrophilicity and resistance to chemicals.

SUMMARY OF THE INVENTION

The diaphragm of the present invention is composed preponderantly of a fluorine-containing polymer having a fluorine content of from 48% to 76% by weight and potassium titanate. The structure of the diaphragm has potassium titanate filling to the pores in a porous fluorine-containing polymer.

The diaphragm of this invention is manufactured by first adding titanium oxide or titanic acid to a fluorine polymer, then adding thereto potassium hydroxide and heating the resulting mixture for thereby converting titanium oxide or titanic acid into potassium titanate.

Said titanium oxide or titanic acid may be produced by adding to the fluorine-containing polymer a water-soluble inorganic titanium compound or alkyl titanate capable of forming said titanium oxide or titanic acid and subsequently decomposing the added compound.

BRIEF DESCRIPTION OF THE DRAWING

FIG. 2 shows X-ray diffraction diagrams of varying diaphragms and potassium titanate.

FIGS. 3-1 and 3-2 are photographs taken of diaphragm of the present invention through a scanning type electron microscope at 3000 and 10000 magnifications, respectively.

FIGS. 4-1 and 4-2 are photographs taken of diaphragm molded by mixing a polymer with a potassium titanate fiber (available on the market) through a scanning type electron microscope at 3000 and 10000 magnifications, respectively.

DETAILED DESCRIPTION OF THE INVENTION

Figure 1:
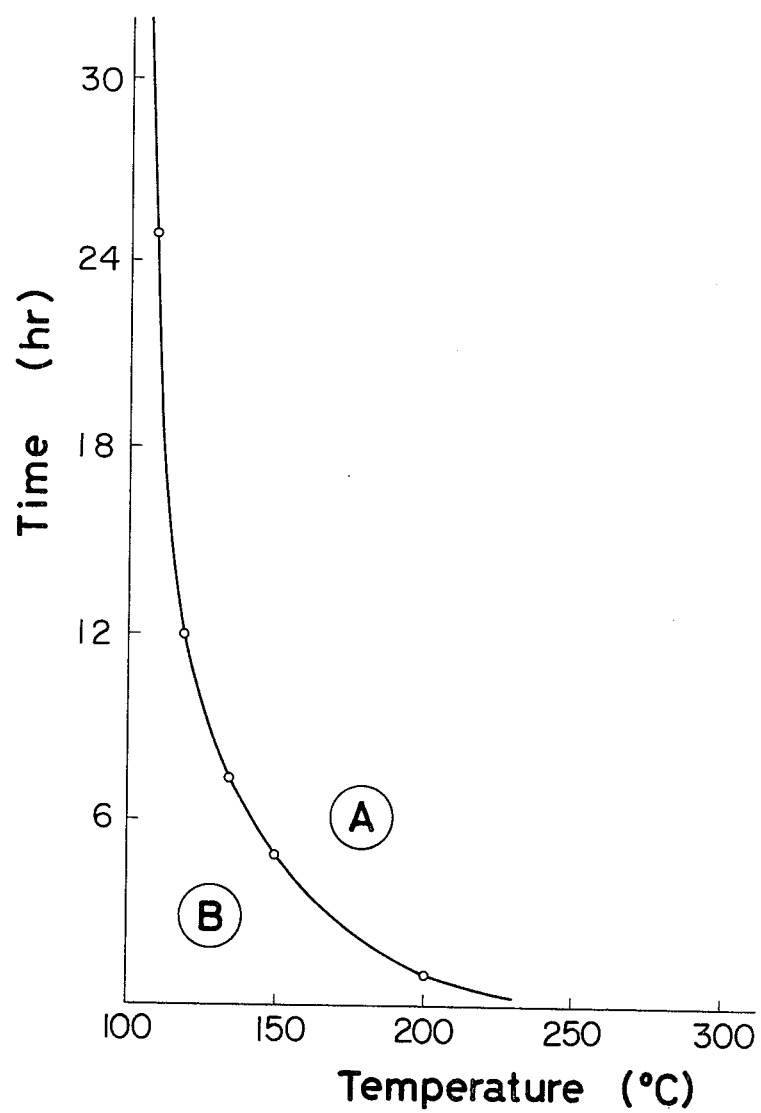
FIG. 1 is a graph showing the relation between the temperature and time of heating in the production of potassium titanate through the thermal reaction of titanium oxide or titanic acid incorporated in a fluorine-containing polymer with potassium hydroxide, with reference to the formation of potassium titanate.

The diaphragm of the present invention is composed preponderantly of a fluorine-containing polymer having a fluorine-content of from 48% to 76% by weight and potassium titanate.

Examples of fluorine-containing polymers which are usable for the present invention are homopolymers and copolymers of fluorine-containing monomers such as tetrafluoroethylene, hexafluoropropylene, chlorotrifluoroethylene, trifluoroethylene, vinylidene fluoride and perfluoroalkylvinyl ether. Of these polymers, particularly desirable are homopolymers of tetrafluoroethylene and copolymers of tetrafluoroethylene, any of said fluorine-containing monomers and ethylene. A copolymer comprising tetrafluoroethylene and hexafluoropropylene is desired to have a hexafluoropropylene content of from 0.05% to 95% by weight, a copolymer comprising tetrafluoroethylene and perfluorovinyl ether is desired to have a perfluorovinyl ether content of from 0.05% to 90% by weight, and a copolymer comprising tetrafluoroethylene and ethylene is desired to have an ethylene content of from 0.05% to 66% by weight.

The diaphragm according to the present invention satisfies physical and chemical properties required in electrolytic cells. That is to say, the diaphragm has bulk density of 0.4–3.0, porosity of 10–80%, average pore diameter of 0.1–20$\mu$, amount of water permeated of 0.002–5 ml/cm$^2$·hr·cm H$_2$O and electric resistance of 2–0.1 $\Omega$·cm$^{-2}$. By adjusting the producing conditions there may be produced diaphragms having desired physical and chemical properties. When the diaphragm of the present invention is subjected to alkali-elution test (under aqueous 30% potassium hydroxide at 120° C. for 50 hours), the decrease of the weight thereof is in the range of from 0.055% to 0.05%. In the diaphragm of the present invention, the weight ratio of the potassium titanate content to the fluorine-containing polymer content is desirably in the range of from 0.05 to 1.20. In case where the weight ratio of potassium titanate exceeds the upper limit the diaphragm becomes so weak as to lack the strength required in use, whereas in case where it does not exceed the lower limit the physical and chemical properties of the diaphragm such as the amount of water permeated, electric resistance, etc. are seriously impaired.

In producing the diaphragm according to this invention, the fluorine-containing polymer which is one of the major raw materials can be used in either the porous form or the powdered form. First, the case using a porous fluorine-containing polymer will be described.

For use in the present invention, the porous fluorine-containing polymer is produced from any of the aforementioned fluorine-containing polymers as the raw material by a method which comprises preparing the polymer in the form of a fibrous powder and molding the powdered polymer in a continuous sheet (Japanese patent publication No. 5244/67 or Japanese patent publication No. 11642/65), a method which comprises simultaneously extruding and rolling the polymer powdered and added with a lubricant in advance or first extruding and then rolling said polymer for thereby producing an unburnt shaped article and subsequently stretching the article for thereby setting the voids produced in the article (Japanese patent publication No. 13560/67, Japanese patent publication No. 34388/73 or Japanese patent disclosure No. 4273/74) or a method which comprises mixing the polymer in a powdered form with another powder capable of extraction or exudation, molding the resultant mixture in a desired shape and subsequently causing said latter powder to be extracted or exuded from the shaped article (Japanese patent publication No. 9708/73, Japanese patent publication No. 34303/74, Japanese patent disclosure No. 5065/73 or Japanese patent disclosure No. 56578/73).

As the next step, titanium oxide or titanic acid is added to said porous fluorine-containing polymer so as to be lodged in the pores distributed in the polymer.

This incorporation of titanium oxide or titanic acid into the porous polymer is accomplished by a method which comprises causing a medium having dispersed therein a finely divided titanium oxide or titanic acid to penetrate the porous fluorine-containing polymer, a method which comprises impregnating the porous fluorine-containing polymer with the aqueous solution of a water-soluble inorganic titanium compound such as titanium chloride, titanium sulfate or oxidized titanium sulfate and subsequently converting the incorporated titanium compound into titanium oxide or titanic acid by hydrolysis or thermal decomposition, or a method which comprises impregnating the porous fluorine-containing polymer with a solution of an organic compound such as an alkyl titanate having the structural formula:

$$Ti_m \cdot (OR)_{2m+2}$$

(wherein, R denotes an alkyl group having 1 to 10 carbon atoms and $m$ is an integer having a value of 1 to 20) and subsequently converting the incorporated alkyl titanate into titanium oxide or titanic acid by hydrolysis or thermal decomposition. In the case of the last method, use of tetraalkyl titanate, especially tetrabutyl titanate, or tetraisopropyl titanate proves advantageous because the organic solution of such titanate readily penetrates the porous fluorine-containing polymer and the incorporated titanate is not required to be hydrolyzed by addition of an alkali and, hence, the troublesome washing which would otherwise be required after the reaction can be disposed with.

The concentration of the titanium compound in the soluble solution with which the porous fluorine-containing polymer is impregnated may be anywhere in the range of from 1% up to the saturated concentration. From the standpoint of the efficiency of impregnation, however, it is desired to exceed the level of 10%.

As already described, the weight ratio of the potassium titanate content to the fluorine-containing polymer content of the finally produced diaphragm is required to fall in the range of from 0.05 to 1.20. It is, therefore, essential that the amount of titanium oxide or titanic acid incorporated in the polymer should be in an amount enough to satisfy this limitation.

Now, the case using a powdered fluorine-containing polymer will be described.

In this case, required incorporation of titanium oxide or titanic acid into the polymer is accomplished easily by a method which comprises mixing titanium oxide or titanic acid in a powdered form with said fluorine-containing polymer prepared in a powdered form at a mixing ratio of from 1:0.05 to 1:1.1 and molding the resultant mixture in a required shape. By this method, the weight ratio of the fluorine-containing polymer and potassium titanate contents of the finally produced diaphragm and the important properties such as bulk density, surface area, porosity and average pore diameter which the diaphragm is required to possess can easily be adjusted by regulating the mixing ratio of the two powders and the pressure under which the mixture is subjected to molding. By this method is obtained a membrane comprising a porous fluorine-containing polymer and titanium oxide or titanic acid. Now the titanium oxide or titanic acid thus incorporated in the membrane is to be converted into potassium titanate. This conversion is accomplished by a method which comprises treating the polymer membrane containing titanium oxide or titanic acid in an aqueous solution containing potassium hydroxide at a concentration of not less than 0.5N, preferably 3N, and up to the practical upper limit of 10N at temperatures exceeding 100° C., preferably in the range of from 120° to 350° C.

In the heat treatment thus carried out, the relation between the temperature and the time is as shown in FIG. 1, wherein the temperature is graduated in Centigrade degrees along the horizontal axis and the time in hours along the vertical axis. In the upper zone of the curve described in the graph (Zone (A) of the graph), conversion of titanium oxide or titanic acid to potassium titanate is completely effected. In the lower zone of the curve (Zone (B) of the graph), however, perfect conversion cannot be obtained no matter how much the concentration of potassium hydroxide may be increased.

The successful conversion of titanium oxide or titanic acid into potassium titanate by the aforementioned method has been ascertained by X-ray diffraction analysis as indicated in the working examples to be cited hereinafter.

Figures 1, 3:
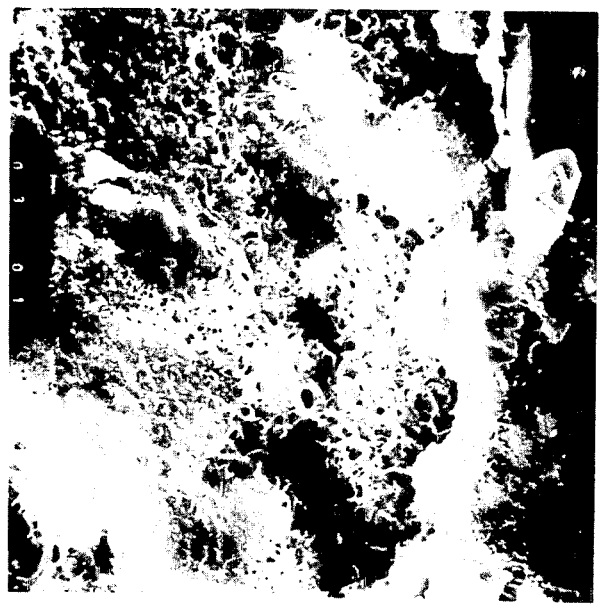
Figures 2, 3:
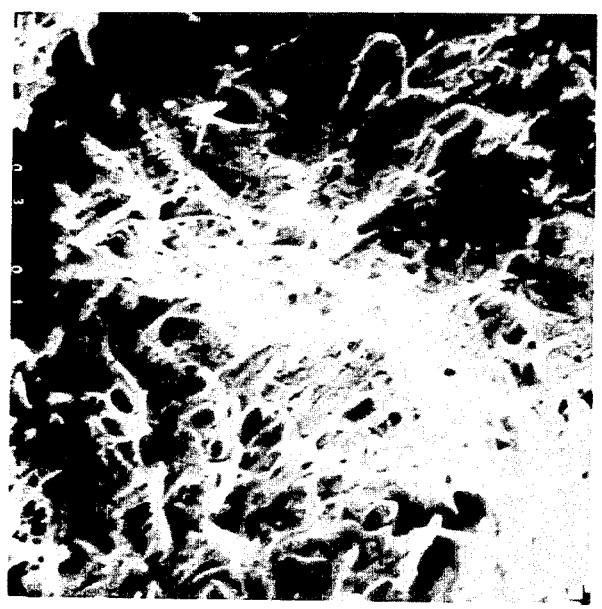
Figures 1, 4:
Figures 2, 4:

The potassium titanate which is obtained in the diaphragm by the method of this invention is in the form of crystals of dendrite type. This microstructural identification has been ascertained by means of a scanning type electron microscope at 3000 and 10000 magnifications (FIGS. 3-1 and 3-2). This means that the potassium titanate of this invention obviously differs from the conventionally known potassium titanate fibers (such as Fybex made by DuPont of the U.S.) which are formed of fiborus crystals. FIG. 4 shows the diaphragm obtained by mixing a polymer with said conventionally known potassium titanate fiber, and FIGS. 4-1 and 4-2 are photographs taken of the diaphragm through a scanning type electron microscope at 3000 and 10000 magnifications respectively. This dendritic structure of the crystals (FIGS. 3-1 and 3-2) contributes to the setting property and the water-permeating property of the porous diaphragm.

The porous composite which is obtained by the present invention has an alkali-resistant, hydrophilic potassium titanate set and deposited to fill up the pores. When this porous composite is used as a diaphragm, the troublesome step of wetting the diaphragm with methylethyl ketone or acetone which would otherwise be required prior to its installation at the place of use can be dispensed with. Further, the distribution of pores can freely be adjusted within the aforementioned specified range by suitably varying the conditions for the manufacture of the porous composite and, better still, the amount of water permitted to penetrate through the diaphragm can freely be controlled. The resistance to alkalis which the diaphragm of the present invention exhibits is distinctly improved as compared with that obtainable by the conventional known method for conferring hydrophilicity (Japanese patent disclosure No. 81281/74 or Japanese patent disclosure No. 1373/76). For example, after 50 hours' standing under an aqueous 30% potassium hydroxide solution at 120° C., the change of weight is as small as less than 0.05% in the case of the diaphragm of this invention, whereas the change is not less than 1% in the case of the diaphragm produced by the conventional method.

The potassium titanate involved in the diaphragm of this invention has an additional advantage that since it has undergone crystallization while in a state deposited in the porous matrix, it enjoys an enhanced setting property because of the anchoring effect. Electrolysis involving exposure to an alkali at elevated temperatures above 90° C. or electrolysis involving use of a highly concentrated aqueous solution of alkali, neither of which has ever been put to practice because of the unavailability of a diaphragm capable of exhibiting excellent resistance to alkalis at elevated temperatures and yet offering low electric resistance, can be realized by use of the diaphragm of this invention.

Now, the present invention will be described more specifically hereinbelow with reference to working examples. The properties to be mentioned in the examples and the methods employed for their determination will be defined below.

(1) Electric resistance ($\Omega$-cm$^{-2}$):

Method of determination—A given diaphragm is thoroughly equilibrated in an aqueous 25% sodium chloride solution and, in an aqueous 25% sodium chloride solution, the equilibrated diaphragm is tested for electric resistance with an alternating current of 1 k.cycle at a temperature of 25° C.

(2) Amount of water permeated (ml/cm$^2$.hr.cm H$_2$0):

Method of determination—An area 100 cm$^2$ of a given diaphragm is held at the bottom of a water column 1 m in height and the amount of distilled water which has penetrated through said area of the diaphragm is measured.

EXAMPLE 1

A porous polytetrafluoroethylene film (hereinafter referred to as porous PTFE film) ("Polyfron Paper PA-5L," 0.5 mm in thickness, made by Daikin Kogyo) was immersed in a solution consisting of 100 parts (by weight; the same applicable hereinafter) of tetrabutyl titanate (Grade No. B-4, made by Nihon Soda; hereinafter referred to as TBT) and 40 parts of methylethyl ketone (hereinafter referred to as MEK) until said PTFE film was uniformly impregnated with the solution. Then, the film was lifted out of the solution and placed gently in hot water at 80° C., with the result that the reaction of hydrolysis proceeded on said TBT. After this reaction had continued for about four hours, the film was lifted up from the hot water and dried at 200° C. to have the organic substances and water thoroughly expelled through vaporization. The X-ray diffraction diagram of the film shown in FIG. 2-2 shows the diffraction pattern of titanium oxide, indicating that TBT had undergone hydrolysis and dehydration. (FIG. 2-1 represents the X-ray diffraction diagram of the PTFE film.) In the diagrams of FIG. 2, the horizontal axis is graduated for Angle of Diffraction 2$\Theta$ and the vertical axis for Intensity I/Io. The PTFE film which had been treated as described above was used as the matrix membrane for the treatment of this invention.

Said matrix membrane was then immersed in an aqueous 20% potassium hydroxide solution contained in a vessel made of nickel. The vessel containing the membrane was heated in an autoclave at 120° C. for 12 hours. After the heating, the PTFE film was removed from said aqueous solution of potassium hydroxide, then washed with water until the pH value of washings fell below 7.3 and thereafter dried to afford a diaphragm incorporating potassium titanate according to this invention. The X-ray diffraction diagram of this diaphragm is shown in FIG. 2-3. This diffraction pattern shows a peak similarly to the diffraction diagram of potassium titanate of FIG. 2-6. The weight increase due to the treatment with potassium hydroxide was 5.5%. This value preferably agrees with the percentage of weight change obtainable on the assumption that, in a matrix membrane having deposited therein titanium oxide or titanic acid in the amount of 35% calculated as titanium oxide, the treatment with potassium hydroxide has converted titanium oxide completely into potassium titanate.

The properties of the diaphragm thus obtained are shown in Table 1.

Table 1

|  | Matrix film | Treated film |
|---|---|---|
| Amount of water permeated | 0.8 | 0.6 |
| Electric resistance | 2.5 | 0.27 |
| Potassium titanate/polymer | polymer | 0.30 |
| porosity | 25% | 30% |
| Average port diameter | 1~2$\mu$ | about 1$\mu$ |

EXAMPLE 2

Three porous PTFE films identical to that used in Example 1 were immersed in a solution consisting of 100 parts of TBT and 40 parts of MEK until the porous PTFE films were uniformly impregnated with the solution. After the impregnation, the PTFE films were lifted out of the solution and placed gently in a hot water at 60° C., with the result that the reaction of hydrolysis proceeded on the TBT. After the reaction had continued for about 3 hours, the films were lifted out of the hot water and dried at 80° C., 200° C. and 350° C. respectively to have the organic substances and water thoroughly expelled therefrom through vaporization. The PTFE films were then squeezed through two rolls to have their thickness decreased from 0.5 mm to 0.3 mm. The PTFE films were placed in an aqueous 30% potassium hydroxide solution contained in a vessel made of nickel. The films as held in the vessel were heated in an autoclave at 200° C. for 1 hour. Thereafter, the PTFE films were thoroughly washed with water and dried. The properties of the films thus obtained are shown in Table 2.

Table 2

| Sample No. | Drying temperature of film (° C) | Electric resistance | | Amount of Water permeated | |
|---|---|---|---|---|---|
|  |  | Matrix film | Treated film | Matrix film | Treated film |
| 4 | 80 | 1.7 | 0.44 | 0.40 | 0.19 |
| 5 | 200 | 9.0 | 0.56 | 0.13 | 0.28 |
| 6 | 350 | 48.0 | 0.87 | 0.06 | 0.28 |

| | No. 4 | | No. 5 | | No. 6 | |
|---|---|---|---|---|---|---|
|  | Matrix film | Treated film | Matrix film | Treated film | Matrix film | Treated film |
| Porocity (cc/g) | 0.2 | 0.3 | 0.2 | 0.2 | 0.2 | 0.2 |
| Average pore diameter ($\mu$) | 0.5 | 1 | 1 | 1 | 2 | 2 |

These films were immersed in MEK for one hour and thereafter transferred into water to displace MEK with water. Then the properties of the films were determined. The results are shown in Table 3.

Table 3

| Sample No. | Electric resistance Matrix film | Electric resistance Treated film | Amount of water permeated Matrix film | Amount of water permeated Treated film |
|---|---|---|---|---|
| 4 | 0.637 | 0.56 | 5.5 | 0.20 |
| 5 | 0.637 | 0.56 | 4.5 | 0.27 |
| 6 | 0.637 | 0.56 | 4.7 | 0.28 |

The samples No. 4, 5 and 6 were immersed in an aqueous 30% potassium hydroxide solution and heated in an autoclave at 120° C. for 72 hours. After the heating, the samples were weighed to find the ratio of weight change. In none of the samples did the weight change exceeded 0.03%. After the heating, the fluorine content, film composition, bulk density, etc. were found to be the same as those indicated in Table 2.

EXAMPLE 3

A porous PTFE film ("Polyfron Paper PA-10L," 1 mm in thickness, made by Daikin Kogyo) was immersed in a solution consisting of 100 parts of TBT, 40 parts of MEK and 10 parts of an organic dispersion of finely powdered tetrafluoroethylene-hexafluoropropylene (the fluorine content is 76% by weight) copolymer (hereinafter referred to as FEP) ("Neofron Dispersion ND-2," made by Daikin Kogyo) until the PTFE film was uniformly impregnated with the solution. Thereafter, the film was gently immersed in water and left to stand therein for 30 minutes. At the end of the standing, the film was lifted out of the water, then heated at 350° C. for 30 minutes to dry the film and, at the same time, to set the finely powdered FEP fast in the PTFE film. The PTFE film was subsequently squeezed through rolls to decrease the thickness from 1 mm to 0.3 mm. The PTFE film as the matrix membrane was subjected to a further treatment by following the procedure of Example 2, except it was heated at 155° C. for 6 hours.

The membrane which had undergone this treatment was instantaneously impregnated with water when it was placed in water, whereas the matrix membrane prior to the treatment floated on water and did not permit penetration of water.

The properties of the membrane thus obtained are shown in Table 4.

Table 4

| | Matrix film | Treated film |
|---|---|---|
| Amount of water permeated | 0.001> | 0.004 |
| Electric resistance | 4.15 × 10³ | 1.01 |
| Potassium titanate/polymer | | 0.35 |
| Porosity | 40% | 40% |
| Average pore diameter | 2µ | ~1~µ |

EXAMPLE 4

A PTFE film ("Floropore F-045," 0.2 mm in thickness, made by Sumitomo Electric Industry) was treated by following the procedure of Example 1. The properties of the membrane consequently obtained are shown in Table 5.

Table 5

| | Matrix film | Treated film | Matrix* film | Treated* film |
|---|---|---|---|---|
| Amount of water permeated | 0.001> | 0.008 | 0.015 | 0.010 |
| Electric resistance | 260 | 0.82 | 3.04 | 0.84 |
| Potassium titanate/polymer | | 0.25 | | 0.25 |
| Porosity | 30% | 35% | | |
| Average pore diameter | ~1~µ | 0.5µ | | |

Note: The data given in the asterisked (*) columns were those determined of the membranes which were first wetted with MEK and then placed in water for displacement of MEK with water.

EXAMPLE 5

A PTFE film ("Goatex Grade L-10213," 1 mm in thickness, made by W. L. Goa and Association of the U.S.A.) was treated by following the procedure of Example 1. The properties of the membrane consequently obtained are shown in Table 6.

Table 6

| | Matrix film | Treated film |
|---|---|---|
| Amount of water permeated | 0.073 | 0.01 |
| Electric resistance | 1.56 | 0.62 |
| Potassium titanate/polymer | | 0.40 |
| Porosity | 40% | 40% |
| Average pore diameter | 2µ | 0.5µ |

EXAMPLE 6

A porous PTFE film ("Polyfron Paper PA-5L," made by Daikin Kogyo) was placed in a suspension consisting of 25 parts of ortho-titanic acid ($Ti(OH)_4$) (made by Futaba Chemicals) finely powdered in advance with a ball mill, 100 parts of water and 2 parts of a surface active agent (Nissan Nonion HS-215, made by Nippon Oils and Fats) and subjected to ultrasonic waves to have the film impregnated with said ortho-titanic acid. Thereafter, the film was lifted out of the suspension and dried at 120° C. The film was cleaned of the portion of ortho-titanic acid adhering to the outer surface. The resulting film as the matrix membrane was treated by following the procedure of Example 2, except it was heated at 200° C. for 3 hours. The properties of the membrane thus obtained are shown in Table 7.

Table 7

| | Matrix film | Treated film |
|---|---|---|
| Amount of water permeated | 1.2 | 0.84 |
| Electric resistance | 0.87 | 0.65 |
| Potassium titanate/polymer | | 0.15 |
| Porosity | 12% | 10% |
| Average pore diameter | ~1~µ | 0.5µ |

The matrix membrane prior to the treatment and the treated membrane were held in an aqueous 5% potassium hydroxide solution and boiled in the solution for one hour. While the solution containing the matrix membrane became turbid owing to exudation of a gel-like substance from the membrane, the solution containing the treated membrane did not become turbid.

EXAMPLE 7

The procedure of Example 6 was faithfully repeated, except said ortho-titanic acid was substituted with titanium oxide (anatase). The properties of the membrane consequently obtained are shown in Table 8.

Table 8

| | Matrix film | Treated film |
|---|---|---|
| Amount of water permeated | 0.62 | 0.26 |

Table 8-continued

| | Matrix film | Treated film |
|---|---|---|
| Electric resistance | 1.07 | 0.52 |

EXAMPLE 8

A powdered PTFE ("Polyfron M-12," made by Daikin Kogyo) and powdered glass fiber ("Glass Powder PF-001," made by Nitto Spinning) were weighed out in a ratio of 60:40 and blended in a mixer. In a doughnut-shaped metal molding form 100 mm in outside diameter and 50 mm in inside diameter, 2.1 kg of the resultant mixture was molded under a pre-molding pressure of 220 kg/cm$^2$ by an ordinary method. A sheet 0.2 mm in thickness was obtained from the resultant molded article by skiving. This film was immersed in hydrofluoric acid at room temperature for 48 hours and then treated with hydrochloric acid to have all the glass particles completely dissolved out of the sheet. The porous PTFE sheet thus obtained was treated by following the procedure of Example 1. The properties of the membrane thus obtained are shown in Table 9.

Table 9

| | Matrix film | Treated film |
|---|---|---|
| Amount of water permeated | 0.003 | 0.002 |
| Electric resistance | 2.06 | 0.92 |
| Potassium titanate/polymer | | 0.1 |
| Porosity | | 15% |
| Average pore diameter | 5~6μ | 3~4μ |

The treated membrane was left to stand in an aqueous 30% potassium hydroxide solution at 120° C. for 56 hours. After the standing, the membrane was found to undergo a weight change of +0.01%. No change was detected in the properties.

EXAMPLE 9

A porous sheet obtained by the procedure of Example 8 was immersed in acetone, then transferred into water to have the incorporated acetone displaced with water. The porous sheet in a state wetted with water was immersed in an aqueous 20% titanium sulfate solution for two hours. Subsequently, it was immersed in an aqueous 28% ammonia solution to have the titanium sulfate converted into titanic acid. Then, the sheet was thoroughly washed with distilled water to dissolve out all substances incorporated other than titanic acid and thereafter dried at 120° C. The sheet was then cleaned of the portion of titanic acid adhering to the outer surface. The sheet as the matirx membrane was treated by following the procedure of Example 2, except it was heated at 200° C. for 12 hours. The properties of the membrane thus obtained are shown in Table 10.

Table 10

| | Matrix film | Treated film |
|---|---|---|
| Amount of water permeated | 0.003 | 0.002 |
| Elctric resistance | 1.25 | 0.64 |
| Potassium titanate/polymer | | 0.2 |
| Porosity | | 20% |
| Average pore diameter | 5μ | 3μ |

The matrix membrane prior to the treatment and the treated membrane were boiled in an aqueous 20% potassium hydroxide solution at about 100° C. for 2 hours. The solution containing the matrix membrane became heavily turbid and the solution containing the treated membrane remained intact.

EXAMPLE 10

In a mixer, 70 parts of a powdered PTFE ("Polyfron M-12," made by Daikin Kogyo) and 30 parts of titanium oxide (anatase) were mixed. The resultant mixture was compression molded by an ordinary method to afford a molded article having a porosity of 12% and containing titanium oxide. A sheet 0.2 mm in thickness was obtained by skiving from this molded article. The sheet as the martix membrane was treated by following the procedure of Example 2, except it was heated at 200° C. for 24 hours. The properties of the membrane thus obtained are shown in Table 11.

Table 11

| | Matrix film | Treated film |
|---|---|---|
| Amount of water permeated | 0.019 | 0.017 |
| Electric resistance | 6.20 | 2.08 |
| Potassium titanate/polymer | | 0.25 |
| Porosity | 10% | 10% |
| Average pore diameter | 10μ | 8μ |

The matrix membrane prior to the treatment and the treated membrane were placed in an aqueous 5% potassium hydroxide solution and boiled therein for one hour. The solution containing the matrix membrane became turbid owing to occurrence of a white suspension and the solution containing the treated membrane did not produce any suspension.

The X-ray diffraction diagram of the matrix membrane is shown in FIG. 2-4 and that of the treated membrane in FIG. 2-5 respectively. In the diagrams, F and G denote the peaks of titanium oxide and potassium titanate.

EXAMPLE 11

A sheet 2 mm in thickness and 12 cm each in length and width was obtained by compression molding glass fiber-containing pellets of a copolymer of tetrafluoroethylene and ethylene ("Tefzel 70G-25", made by DuPont of the U.S.A.) at 300° C. The thickness of this sheet was decreased to 1.5 mm by scraping the surface portion. The sheet was immersed in hydrofluoric acid at room temperature for 48 hours and further treated with hydrochloric acid to dissolve out all the glass fiber particles completely from the sheet. The porous sheet thus obtained was treated by following the procedure of Example 1. The properties of the membrane thus obtained are shown in Table 12.

Table 12

| | Treated film |
|---|---|
| Amount of water permeated | 0.002 |
| Electric resistance | 1.32 |
| Potassium titanate/polymer | 1.0 |
| Porosity 40% | |
| Average pore diameter | 10μ |

What is claimed is:

1. A method for the manufacture of a diaphragm excellent in water-permeating property and resistance to chemicals, which method comprises preparing a porous film of a mixture consisting of a fluorine-containing polymer is one member selected from the group consisting of a homopolymer of tetrafluoroethylene copolymers of tetrafluoroethylene and hexafluoropropylene, copolymers of tetrafluoroethylene and perfluorovinyl ether, and copolymers of tetrafluoroethylene and ethylene and at least one member selected from the group consisting of titanium oxide and titanic acid, immersing said film in an aqueous potassium hydroxide solution of 0.5N - 10N and subsequently heating said film at 100 to 350° for thereby giving birth to potassium titanate within the film.

2. The method according to claim 1, wherein the film is produced by mixing a powdered fluorine-containing polymer and at least one powdered titanium compound selected from the group consisting of titanium oxide and titanic acid and subsequently molding the resultant mixture to a required shape.

3. The method according to claim 1, wherein the film is produced by immersing a porous fluorine-containing film in a medium having dispersed thereon at least one finely divided titanium compound selected from the group consisting of titanium oxide and titanic acid.

4. The method according to claim 1, wherein the film is produced by having a porous fluorine-containing polymer film impregnated with an aqueous solution of a water-soluble inorganic titanium compound and subsequently decomposing said water-soluble inorganic titanium compound.

5. The method according to claim 1, wherein the water-soluble inorganic titanium compound is at least one member selected from the group consisting of titanium chloride, titanium sulfate and oxidized titanium sulfate.

6. The method according to claim 1, wherein the film is produced by immersing a porous fluorine-containing polymer film in a solution of an alkyl titanate of the generic formula:

$$Ti_m(OR)_{2m+2}$$

(wherein, R denotes an alkyl group having 1 to 10 carbon atoms and $m$ is an integar having the value of 1 to 20) and subsequently decomposing the incorporated alkyl titanate.

7. The method according to claim 6, wherein the alkyl titanate is tetrabutyl titanate.

8. The method according to claim 6, wherein the alkyl titanate is tetraisopropyl titanate.

* * * * *